US012209524B2

(12) United States Patent
Kumar et al.

(10) Patent No.: US 12,209,524 B2
(45) Date of Patent: Jan. 28, 2025

(54) EXHAUST FLUID INJECTOR ASSEMBLY

(71) Applicant: Caterpillar Inc., Peoria, IL (US)

(72) Inventors: Samuel S. Kumar, Dunlap, IL (US); Anthony C. Rodman, Peoria, IL (US); Kelsey A. Unser, Peoria, IL (US); Ramakrishna Manda, Dunlap, IL (US); Glen C. Martin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 340 days.

(21) Appl. No.: 17/894,151

(22) Filed: Aug. 23, 2022

(65) Prior Publication Data

US 2024/0068388 A1 Feb. 29, 2024

(51) Int. Cl.
*F01N 3/20* (2006.01)
*B01F 25/312* (2022.01)
*F01N 3/28* (2006.01)

(52) U.S. Cl.
CPC ........ *F01N 3/208* (2013.01); *B01F 25/31252* (2022.01); *F01N 3/206* (2013.01); *F01N 3/28* (2013.01)

(58) Field of Classification Search
CPC . F01N 3/28; F01N 3/206; F01N 3/208; B01F 25/31252
See application file for complete search history.

(56) References Cited

U.S. PATENT DOCUMENTS 8,955,771 B2 2/2015 Toshev et al.
9,168,545 B2 10/2015 Vidusek et al.
9,234,445 B2 1/2016 Trivedi et al.
9,512,763 B2 12/2016 Hudgens et al.
9,821,282 B2 11/2017 Li et al.
10,766,044 B2 9/2020 Yi et al.
10,774,718 B2 9/2020 Manda et al.
10,851,932 B2 12/2020 Hackel et al.
10,888,885 B2 1/2021 Manda Venkata Naga et al.
(Continued)

FOREIGN PATENT DOCUMENTS

CN 104057097 B 9/2014
CN 214515563 U 10/2021
(Continued)

OTHER PUBLICATIONS

Unpublished U.S. Appl. No. 17/317,865, Exhaust Fluid Injector Assembly, filed May 11, 2021.
(Continued)

*Primary Examiner* — J C Jacyna
(74) *Attorney, Agent, or Firm* — Claim Construction PLLC

(57) ABSTRACT

A diesel exhaust fluid (DEF) nozzle includes a first conduit, an outlet of the first conduit defining an inlet of a first mixing chamber; and a second conduit disposed around the first conduit, an outer surface of the first conduit and an inner surface of the second conduit defining a second flow path therebetween. A flow area of the second flow path decreases from an inlet of the second flow path to a throat, and increases from the throat to an outlet of the second flow path. The inner surface of the second conduit defines a peripheral wall of the first mixing chamber, and a peripheral wall of a second mixing chamber, the first flow path and the second flow path being in fluid communication with the second mixing chamber via the first mixing chamber.

20 Claims, 10 Drawing Sheets

(56) References Cited

U.S. PATENT DOCUMENTS

| | | | |
|---|---|---|---|
| 10,894,237 | B2 | 1/2021 | Manda Venkata Naga et al. |
| 10,953,373 | B2 | 3/2021 | Manda Venkata Naga et al. |
| 11,105,241 | B2 | 8/2021 | Tucker et al. |
| 11,156,141 | B2 | 10/2021 | Short et al. |
| 2009/0166448 | A1 | 7/2009 | Wurz et al. |
| 2014/0154142 | A1 | 6/2014 | Johnson et al. |
| 2020/0156016 | A1* | 5/2020 | Manda Venkata Naga ................. B01F 25/31322 |
| 2020/0156024 | A1 | 5/2020 | Manda Venkata Naga et al. |
| 2020/0156093 | A1 | 5/2020 | Yi et al. |
| 2020/0224571 | A1 | 7/2020 | Shah et al. |
| 2021/0404367 | A1 | 12/2021 | Alano et al. |
| 2022/0040722 | A1 | 2/2022 | Gao et al. |
| 2022/0074378 | A1* | 3/2022 | John .................. F02M 61/1846 |
| 2022/0364490 | A1* | 11/2022 | Kumar ...................... F01N 3/30 |
| 2022/0372942 | A1* | 11/2022 | Martin ................... F02M 61/18 |
| 2023/0137910 | A1* | 5/2023 | Singh ........................ F23R 3/50 60/752 |

FOREIGN PATENT DOCUMENTS

| | | | |
|---|---|---|---|
| CN | 113751218 | A | 12/2021 |
| GB | 3321483 | B1 | 5/2018 |
| WO | WO2021062418 | A1 | 4/2021 |

OTHER PUBLICATIONS

Promat Inc., Material Safety Data Sheet for FREE FLOW 1000X, Sep. 1, 2016, Maryville, TN, USA.

E.J. Gutmark and F.F. Grinstein, Flow Control with NonCircular Jets, Annu. Rev. Fluid Mech. 1999. 31:239-72.

Tian Zhang et al., Numerical simulation of the dimensional transformation of atomization in a supersonic aerodynamic atomization dust-removing nozzle based on transonic speed compressible flow, Int J Coal Sci Technol (2020) 7(3):597-610.

* cited by examiner

EXHAUST FLUID INJECTOR ASSEMBLY

TECHNICAL FIELD

The present disclosure is directed to an exhaust treatment system and, more particularly, to an injector assembly for injecting a reductant solution into an exhaust gas path within an exhaust treatment system.

BACKGROUND

Internal combustion engines may generate an exhaust stream containing a mixture of combustion products, which may include nitrogen oxides ($NO_x$), such as NO and $NO_2$. Some constituents in an exhaust stream, such as nitrogen oxides, may be subject to government regulation depending on the engine type and the type of machine embodying the engine. In turn, engine manufacturers endeavor to control regulated emissions through in-cylinder emissions control strategies, aftertreatment emissions control strategies, or combinations thereof.

Selective Catalytic Reduction (SCR) is a known after-treatment emissions control strategy. In some SCR processes, a gaseous and/or liquid reductant, commonly urea ($(NH_2)2CO$), is selectively added to the engine exhaust using one or more injectors. The injected reductant may thermally decompose into ammonia ($NH_3$), react with $NO_x$ and other exhaust constituents on the surface of an SCR catalyst, and convert at least some of the exhaust $NO_x$ into unregulated emissions, such as water ($H_2O$) and diatomic nitrogen ($N_2$).

U.S. Pat. No. 9,168,545 (hereinafter "the '545 patent") purports to describe a spray nozzle assembly that uses pressurized air to internally atomize a liquid before discharging the liquid from the nozzle assembly. The spray nozzle of the '545 patent includes a liquid supply passage and a plurality of air supply passages that are in fluid communication with discharge orifices via a chamber, where the chamber includes an impingement post with a diffuser.

While the '545 patent purports that the spray nozzles pre-mix pressurized air with a liquid inside the nozzles, the spray nozzles of the '545 patent may be suboptimal. For example, the structure of the internal flow passages may result in incomplete mixing of the air and liquid streams, and therefore may not result in a desired level of atomization, evaporation, and spatial uniformity of the liquid constituent downstream of the spray nozzles. Where the injected liquid is an exhaust stream reductant, the non-atomized reductant may not fully evaporate to react with exhaust $NO_x$ on the surface of the SCR catalyst, and as a result may impair the $NO_x$ conversion efficiency of the overall SCR process. Further, the '545 patent describes a nozzle having an assembly of multiple distinct parts, and such a multi-piece nozzle configuration may detrimentally increase the nozzle's size, complexity, assembly time, manufacturing cost, or combinations thereof.

Exemplary aspects of the present disclosure are directed to overcoming one or more deficiencies described above.

SUMMARY

According to an aspect of the disclosure, a diesel exhaust fluid (DEF) nozzle, comprises a first conduit disposed about a longitudinal axis, an inner surface of the first conduit defining a first flow path, an outlet of the first conduit defining an inlet of a first mixing chamber, a longitudinal direction being parallel to the longitudinal axis, a transverse direction being transverse to the longitudinal direction; and a second conduit disposed around the first conduit, an outer surface of the first conduit and an inner surface of the second conduit defining a second flow path therebetween.

A flow area of the second flow path decreases from an inlet of the second flow path to a throat, and the flow area of the second flow path increases from the throat to an outlet of the second flow path. The outlet of the second flow path is in direct fluid communication with the first mixing chamber. The inner surface of the second conduit defines a peripheral wall of the first mixing chamber, and the inner surface of the second conduit defines a peripheral wall of a second mixing chamber, the first flow path and the second flow path being in fluid communication with the second mixing chamber via the first mixing chamber. A maximum diametrical span of the second mixing chamber, along the transverse direction, is greater than a diametrical span of an outlet of the first mixing chamber, along the transverse direction.

A first mixing chamber length is defined between the outlet of the first conduit and the outlet of the first mixing chamber, along the longitudinal direction. A transverse gap width of the second flow path is defined as a distance along the transverse direction from the inner surface of the second conduit to the outer surface of the first conduit at the outlet of the first conduit. A ratio of the first mixing chamber length divided by the transverse gap width is not less than 1.9 and not greater than 3.4, the ratio of the first mixing chamber length divided by the transverse gap width being dimensionless.

According to another aspect of the disclosure, an exhaust system for an internal combustion engine includes an exhaust conduit that receives exhaust gas from the internal combustion engine; and an injector for injecting diesel exhaust fluid (DEF) into the exhaust conduit. The injector comprises a first conduit disposed about a longitudinal axis, an inner surface of the first conduit defining a first flow path, an outlet of the first conduit defining an inlet of a first mixing chamber, a longitudinal direction being parallel to the longitudinal axis, a transverse direction being transverse to the longitudinal direction; and a second conduit disposed around the first conduit, an outer surface of the first conduit and an inner surface of the second conduit defining a second flow path therebetween.

A flow area of the second flow path decreases from an inlet of the second flow path to a throat, and the flow area of the second flow path increases from the throat to an outlet of the second flow path. The outlet of the second flow path is in direct fluid communication with the first mixing chamber. The inner surface of the second conduit defines a peripheral wall of the first mixing chamber, and the inner surface of the second conduit defines a peripheral wall of a second mixing chamber, the first flow path and the second flow path being in fluid communication with the second mixing chamber via the first mixing chamber. A maximum diametrical span of the second mixing chamber, along the transverse direction, is greater than a diametrical span of an outlet of the first mixing chamber, along the transverse direction.

A first mixing chamber length is defined between the outlet of the first conduit and the outlet of the first mixing chamber, along the longitudinal direction. A transverse gap width of the second flow path is defined as a distance along the transverse direction from the inner surface of the second conduit to the outer surface of the first conduit at the outlet of the first conduit. A ratio of the first mixing chamber length divided by the transverse gap width is not less than 1.9 and not greater than 3.4, the ratio of the first mixing chamber length divided by the transverse gap width being dimensionless.

According to another aspect of the disclosure, a diesel exhaust fluid (DEF) nozzle, comprises a first conduit disposed about a longitudinal axis, an inner surface of the first conduit defining a first flow path, an outlet of the first conduit defining an inlet of a first mixing chamber, a longitudinal direction being parallel to the longitudinal axis, a transverse direction being transverse to the longitudinal direction; and a second conduit disposed around the first conduit, an outer surface of the first conduit and an inner surface of the second conduit defining a second flow path therebetween.

A flow area of the second flow path decreases from an inlet of the second flow path to a throat, and the flow area of the second flow path increases from the throat to an outlet of the second flow path. The outlet of the second flow path being in direct fluid communication with the first mixing chamber. The inner surface of the second conduit defining a peripheral wall of the first mixing chamber, and the inner surface of the second conduit defining a peripheral wall of a second mixing chamber, the first flow path and the second flow path being in fluid communication with the second mixing chamber via the first mixing chamber.

An intersection of a reference plane and the outer surface of the first conduit defines an outer contour of the first conduit, the reference plane including the longitudinal axis, the outer contour of the first conduit including a convex portion upstream of a first inflection point, and including a concave portion downstream of the first inflection point.

An intersection of the reference plane with the inner surface of the second conduit defines an inner contour of the second conduit, the inner contour of the second conduit including a concave portion upstream of a second inflection point, and including a convex portion downstream of the second inflection point. The concave portion of the inner contour of the second conduit directly faces the convex portion of the outer contour of the first conduit, along the transverse direction.

DETAILED DESCRIPTION

The present disclosure relates generally to nozzles for injecting a mixture of a liquid and a gas into an exhaust stream of a combustion engine. The same reference number(s) will be used throughout the drawings to refer to the same or similar features, unless specified otherwise.

Figure 1:
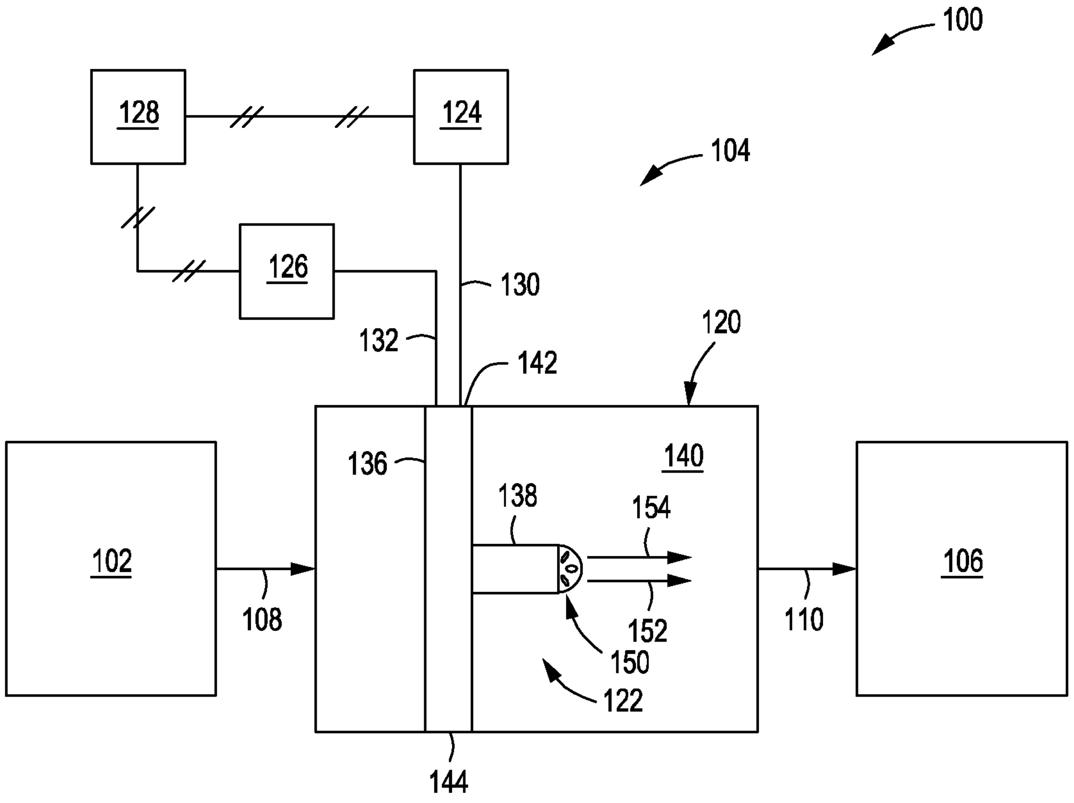
FIG. 1 is a schematic diagram of an engine system, according to an aspect of the disclosure.

FIG. 1 is a schematic diagram of an engine system 100, according to an aspect of the disclosure. The engine system 100 includes an engine 102, an exhaust fluid injection system 104, and an emissions aftertreatment device 106. The exhaust fluid injection system 104 receives a flow of exhaust gas 108 from the engine 102, and the emissions aftertreatment device 106 receives a flow of modified exhaust gas 110 from the exhaust fluid injection system 104. A combination of the exhaust fluid injection system 104 and the emissions aftertreatment device 106 may be referred to herein as an exhaust system.

The engine 102 may be a spark-ignition piston engine, a compression-ignition piston engine, a rotary engine, a gas turbine engine, an electrochemical fuel cell, combinations thereof, or any other engine known in the art to produce an exhaust stream containing the products of a chemical reaction that occurs within the engine 102. The engine 102 may react a fuel with an oxidizer to produce the flow of exhaust gas 108. The engine 102 may be fueled by gasoline, diesel fuel, biodiesel fuel, dimethyl ether, alcohol, seed oils, gaseous or liquid hydrocarbon fuels such as methane or propane, natural gas, hydrogen, combinations thereof, or any other engine fuel known in the art. Oxidizer for the engine 102 may include air, exhaust gas, oxygen, custom blends including oxygen, combinations thereof, or any other oxidizer composition known in the art.

According to an aspect of the disclosure, the engine 102 is a compression-ignition piston engine using an air oxidizer. According to another aspect of the disclosure, the engine 102 is not a spark-ignition engine. According to yet another aspect of the disclosure, the engine 102 is not a gas turbine engine.

The exhaust fluid injection system 104 may include an exhaust duct 120 and an injector assembly 122 disposed at least partly within the exhaust duct 120. Accordingly, the exhaust duct may receive the flow of exhaust gas 108 from the engine 102, and the injector assembly 122 may be at least partly immersed in the flow of exhaust gas 108 within the exhaust duct 120.

The exhaust fluid injection system 104 may also include a supply of exhaust fluid 124, a supply of pressurized gas 126, and a controller 128 that is operatively coupled to the supply of exhaust fluid 124 and the supply of pressurized gas 126. The supply of exhaust fluid 124 is fluidly coupled to the injector assembly 122 via an exhaust fluid conduit 130, and the supply of pressurized gas 126 is fluidly coupled to the injector assembly 122 via a gas conduit 132. The controller 128 may be configured to selectively deliver exhaust fluid, pressurized gas, or both to the injector assembly 122, and may be configured to selectively withhold exhaust fluid, pressurized gas, or both from the injector assembly through operation of valves, pumps, compressors, or any other fluid control devices known in the art.

The exhaust fluid may include ammonia, urea, liquid hydrocarbons, water, combinations thereof, or any other liquid known in the art for injection into an exhaust stream. The pressurized gas may include air, nitrogen, steam, combinations thereof, or any other pressurized gas known in the art for injection into an exhaust stream. According to an aspect of the disclosure, the supply of exhaust fluid 124 is a supply of diesel exhaust fluid (DEF) containing urea, and the supply of pressurized gas 126 is a supply of pressurized air. According to another aspect of the disclosure, the supply of exhaust fluid 124 does not include a gas-phase component, and is exclusively a supply of liquid-phase exhaust fluid.

The injector assembly 122 may include a transverse portion 136 and a nozzle portion 138. The transverse portion 136 at least partly spans an internal volume 140 of the exhaust duct 120, and may be structurally coupled to the exhaust duct 120 at a first end 142, structurally coupled to the exhaust duct 120 at a second end 144, or structurally coupled to the exhaust duct 120 at both the first end 142 and the second end 144. Accordingly, the injector assembly 122 may be attached to or supported by the exhaust duct 120 at the first end 142 of the transverse portion 136, the second end 144 of the transverse portion, or both.

The injector assembly 122 is in fluid communication with the supply of exhaust fluid 124 via the exhaust fluid conduit 130, the supply of pressurized gas 126 via the gas conduit 132, or both. As shown in FIG. 1, the injector assembly 122 is fluidly coupled to the exhaust fluid conduit 130 at the first end 142 of the transverse portion 136, and fluidly coupled to the gas conduit 132 at the first end 142 of the transverse portion 136. However, it will be appreciated that the exhaust fluid conduit 130 and the gas conduit 132 may be fluidly coupled to opposite ends of the transverse portion 136.

The nozzle portion 138 may define one or more outlet apertures 150 that are in direct fluid communication with the internal volume 140 of the exhaust duct 120. Further, the outlet apertures 150 may be in fluid communication with the supply of exhaust fluid 124, the supply of pressurized gas 126, or both, via flow passages defined within the transverse portion 136 and the nozzle portion 138. Thus, the internal volume 140 of the exhaust duct 120 may be in fluid communication with the supply of exhaust fluid 124, the supply of pressurized gas 126, or both, via the injector assembly 122.

The controller 128 may be configured to cause a flow of exhaust fluid 152 from the supply of exhaust fluid 124 into the internal volume 140 of the exhaust duct 120 via the injector assembly 122, cause a flow of gas 154 from the supply of pressurized gas 126 into the internal volume 140 of the exhaust duct 120 via the injector assembly, or cause both a flow of exhaust fluid 152 and a flow of gas 154 into the internal volume 140 of the exhaust duct 120. Although, flow of exhaust fluid 152 and the flow of gas 154 are shown separately in the schematic of FIG. 1, it will be appreciated that the flow of exhaust fluid 152 and the flow of gas 154 may leave the outlet apertures 150 of the injector assembly 122 in a co-mingled mixture.

According to an aspect of the disclosure, the flow of exhaust fluid 152 and the flow of gas 154 leave the outlet apertures 150 in a mixture of atomized exhaust fluid liquid, pre-vaporized exhaust fluid, and the flow of gas 154. As a result, the modified exhaust gas 110 may include the flow of exhaust gas 108 and the flow of exhaust fluid 152, the flow of gas 154, or both the flow of exhaust fluid 152 and the flow of gas 154. The exhaust fluid injection system 104 may be configured to promote spatial and/or temporal uniformity of concentration of exhaust fluid in mixture with the exhaust gas in the modified exhaust gas 110, which is conveyed to the emissions aftertreatment device 106.

The emissions aftertreatment device 106 may include an SCR catalyst, an oxidation catalyst, a particulate filter, combinations thereof, or any other emissions aftertreatment device known in the art to remove constituents from an exhaust stream or chemically convert constituents within an exhaust stream. Further, operation of the emissions aftertreatment device 106 may promote chemical reactions between the flow of exhaust fluid 152 and the flow of exhaust gas 108 in the modified exhaust gas 110. According to an aspect of the disclosure, the emissions aftertreatment device 106 includes an SCR catalyst that is configured to react $NO_x$ in the exhaust gas 108 with the flow of exhaust fluid 152 on the surface of the SCR catalyst, to reduce at least some of the $NO_x$ into water vapor and nitrogen.

Figure 2:
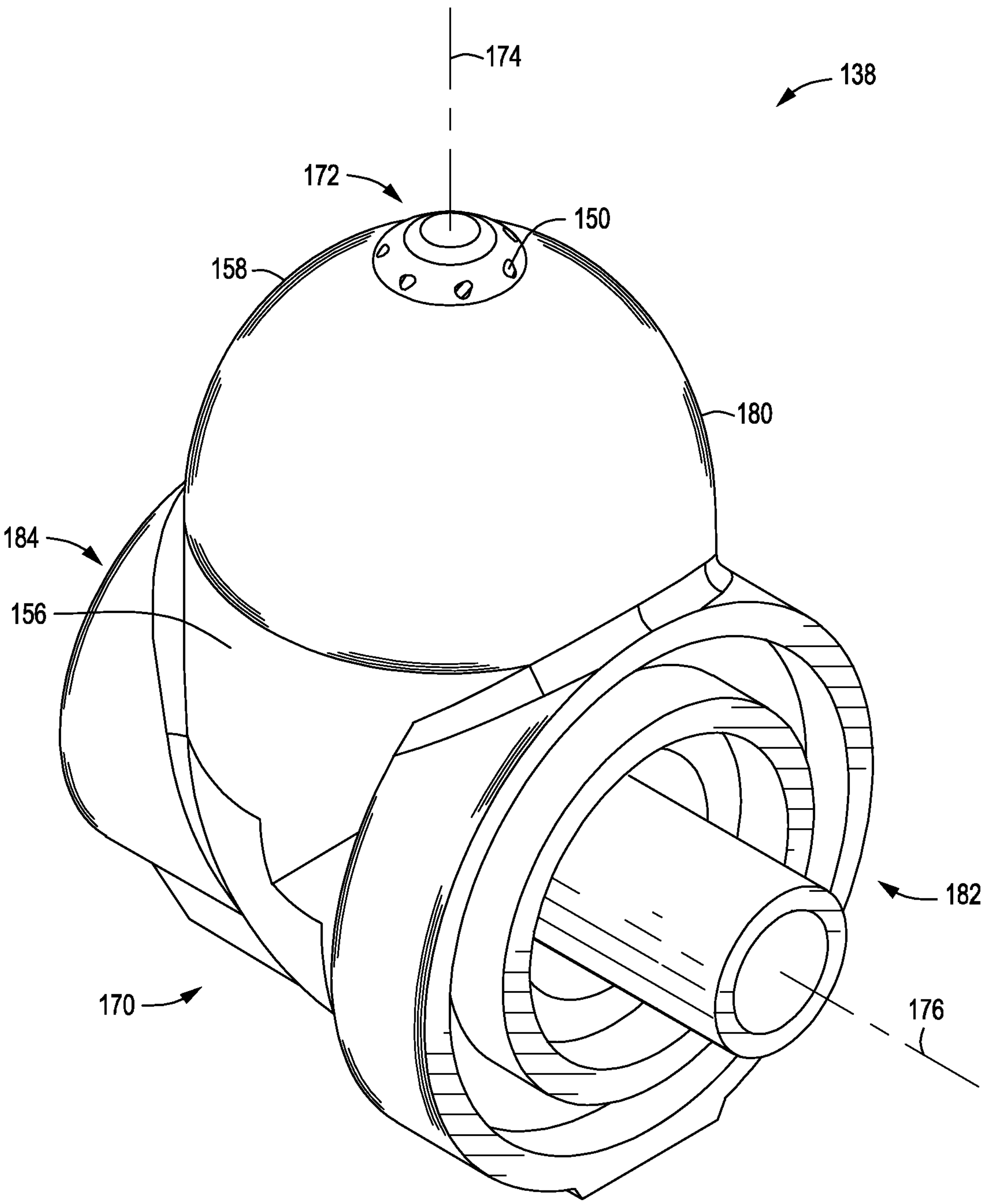
FIG. 2 is a perspective view of a nozzle portion, according to an aspect of the disclosure.

FIG. 2 is a perspective view of a nozzle portion 138, according to an aspect of the disclosure. The nozzle portion 138 may extend from a first end 170 to a second end 172 along a longitudinal axis 174. The nozzle portion 138 includes an external surface 180 that may be in direct contact with exhaust gas when the nozzle portion 138 is installed in an exhaust duct 120.

At the first end 170, the nozzle portion 138 may include a first connection portion 182 that provides features for making fluid connections with the transverse portion 136, supports the nozzle portion 138 in the exhaust duct 120, or both. The first connection portion 182 may be configured to receive socket weld connections, butt weld connections, threaded connections, compression connections, adhesive connections, brazed connections, combinations thereof, or any other fluid connection known in the art. According to an aspect of the disclosure, the first connection portion 182 includes at least one concentric socket weld connection and at least one butt weld connection. According to another aspect of the disclosure, the at least one concentric socket weld connection is a circular cylinder socket weld connection, and the at least one butt weld connection is a circular cylinder butt weld connection. The at least one concentric socket weld connection may be concentric with the at least one butt weld connection.

The second end 172 of the nozzle portion may define the outlet apertures 150 which extend through the external surface 180 to effect fluid communication between the external surface 180 and internal features of the nozzle portion 138. Further, the first connection portion 182 may be in fluid communication with the outlet apertures 150 via internal flow passages through the nozzle portion 138.

The nozzle portion 138 may include a nozzle extension 156 and a nozzle tip 158, where the nozzle extension 156 extends along the longitudinal axis 174 between the nozzle tip 158 and the first end 170 of the nozzle portion 138. An external surface of the nozzle extension 156 may be a cylinder that is centered on the longitudinal axis 174. According to an aspect of the disclosure, the external surface of the nozzle extension 156 is a circular cylinder that is centered on the longitudinal axis 174. It will be appreciated that the external surface 180 of the nozzle extension 156 may have any shape that promotes beneficial interaction with a flow of exhaust gas 108.

The nozzle portion 138 may optionally include a second connection portion 184 located at the first end 170, which provides features for making fluid connections with the transverse portion 136, supports the nozzle portion 138 in the exhaust duct 120, or both. The second connection portion 184 may face away from the first connection portion 182 along a transverse axis 176. The second connection portion 184 may be configured to receive socket weld connections, butt weld connections, threaded connections, compression connections, adhesive connections, brazed connections, combinations thereof, or any other supporting connection known in the art.

According to an aspect of the disclosure, the second connection portion 184 includes a socket weld connection. According to another aspect of the disclosure, the second connection portion 184 is not in fluid communication with any part of the first connection portion 182, and is not in fluid communication with the inside of the nozzle portion 138 when the nozzle portion 138 is assembled with the transverse portion 136 to form the injector assembly 122. Instead, the second connection portion 184 may be blocked from fluid communication with the first connection portion 182 and the internal flow passages of the nozzle portion 138.

The transverse axis 176 is transverse to the longitudinal axis 174. According to an aspect of the disclosure, the transverse axis 176 is perpendicular to the longitudinal axis 174. According to another aspect of the disclosure, the transverse axis 176 is within 25 degrees of perpendicular to the longitudinal axis 174.

Figure 3:
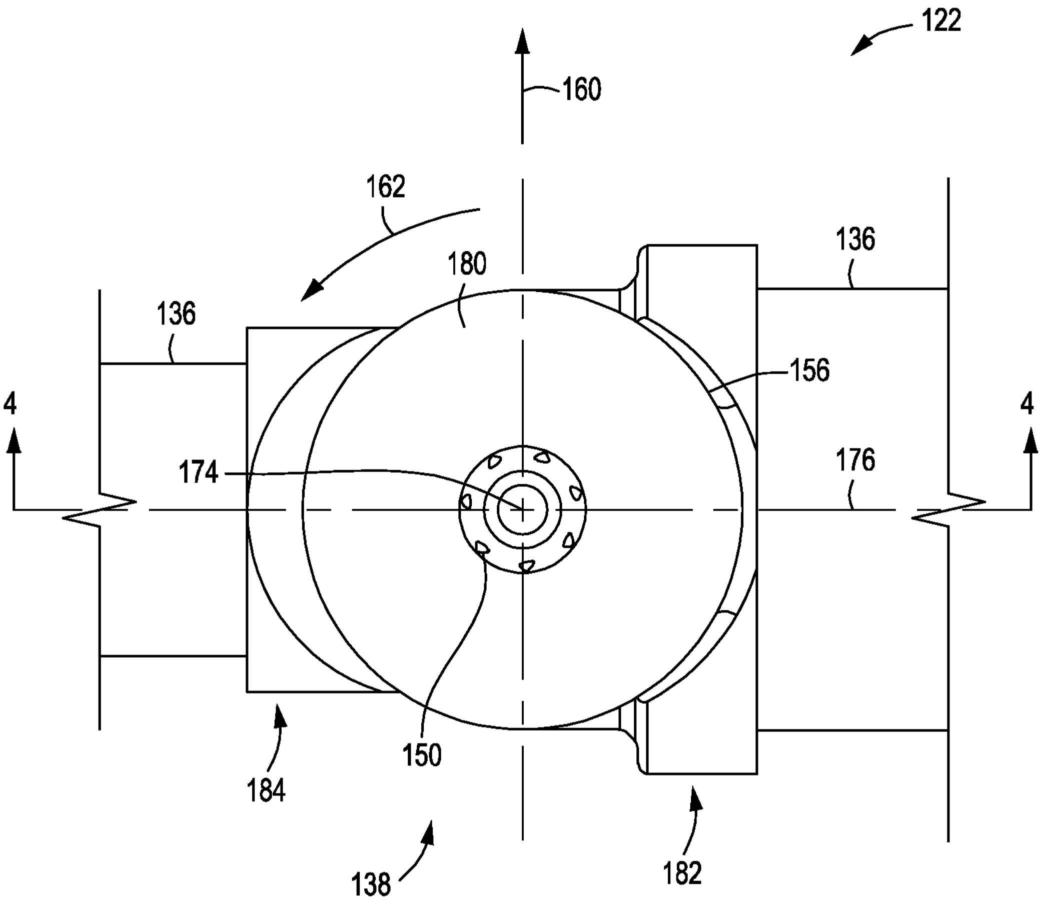
FIG. 3 is a top view of an injector assembly, according to as aspect of the disclosure.

FIG. 3 is a top view of an injector assembly 122, according to as aspect of the disclosure. As shown in FIG. 3, a section line 4-4 may lie in a plane that includes both the transverse axis 176 and the longitudinal axis 174. The nozzle extension 156 illustrated in FIG. 3 may have an external surface that is a circular cylinder that is centered on the longitudinal axis 174.

The structure of the nozzle portion 138 may include surfaces of revolution about the longitudinal axis 174 that can be described in cylindrical coordinates including the longitudinal axis 174, a radial direction 160 extending normal to the longitudinal axis 174, and a circumferential direction 162 encircling the longitudinal axis 174. Being cylindrical coordinates, it will be appreciated that the radial direction 160 may extend away from the longitudinal axis 174 at any circumferential location about the circumferential direction 162.

Individual apertures of the outlet apertures 150 may be arranged in a uniformly-spaced circumferential array along the circumferential direction 162. Further, individual apertures of the outlet apertures may be located at a uniform radial distance from the longitudinal axis 174 along the radial direction 160.

Figure 4:
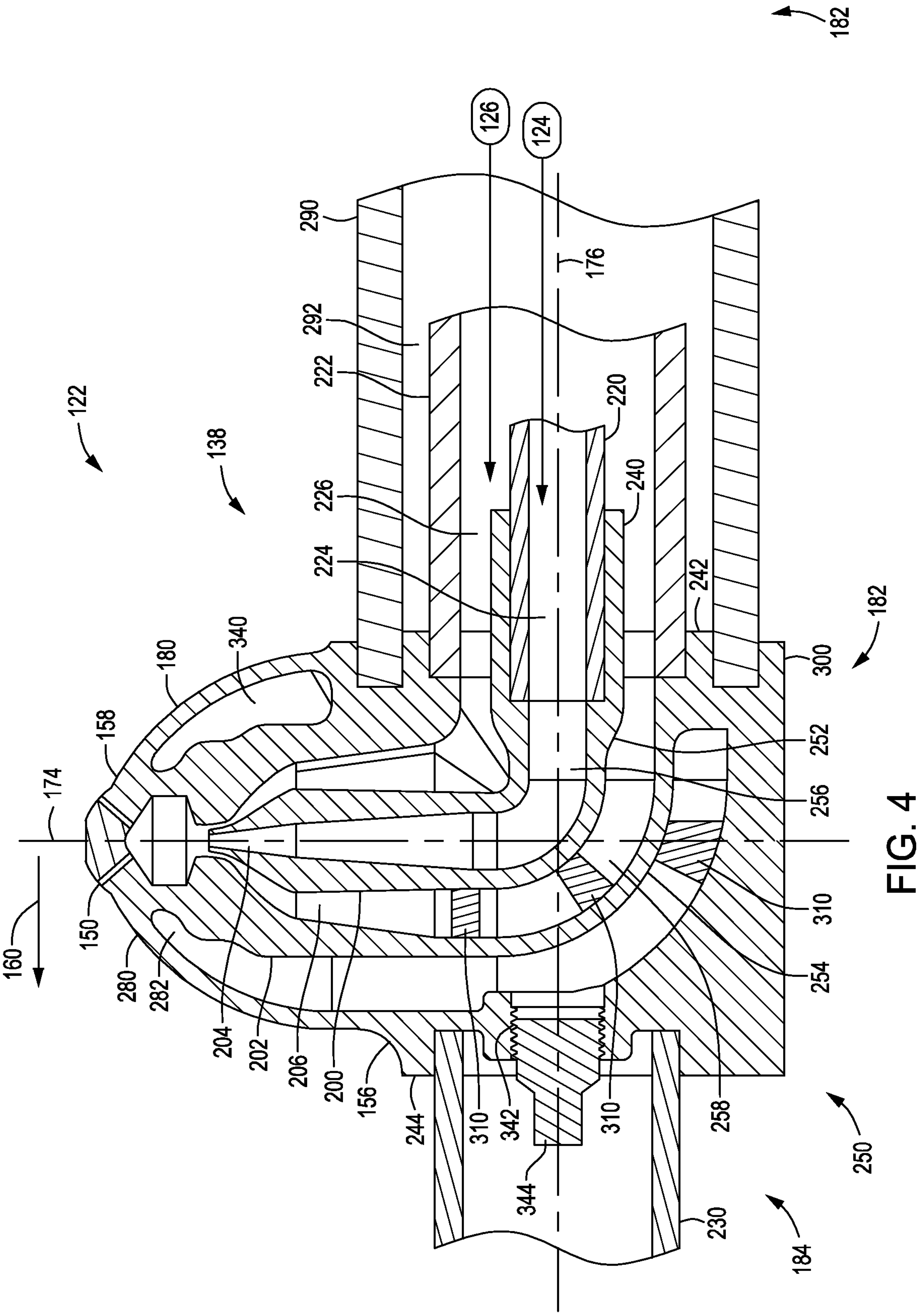
FIG. 4 is a cross-sectional view of an injector assembly, according to an aspect of the disclosure.

FIG. 4 is a cross-sectional view of an injector assembly 122 along section line 4-4, according to an aspect of the disclosure. The nozzle portion 138 may include a first axial conduit 200 extending along the longitudinal axis 174, and a second axial conduit 202 extending along the longitudinal axis 174 and disposed around the first axial conduit 200 about the circumferential direction 162, such that the first axial conduit 200 lies within the second axial conduit 202 along the radial direction 160. The first axial conduit 200 may be concentric with the second axial conduit 202. One or both of the first axial conduit 200 and the second axial conduit 202 may include axisymmetric surfaces of revolution about the longitudinal axis 174.

An internal surface of the first axial conduit 200 defines a first axial flow path 204 through the nozzle portion 138. An external surface of the first axial conduit 200 and an internal surface of the second axial conduit 202 define a second axial flow path 206 through the nozzle portion 138. Thus, the second axial flow path 206 may be an annular flow passage defined between the first axial conduit 200 and the second axial conduit 202.

The external surface of the first axial conduit 200 may directly face the internal surface of the second axial conduit 202 along the radial direction 160. Unless specified otherwise, "directly face" may mean facing along a specified direction without any intervening structures disposed between the facing elements along the specified direction. Further, a first element may directly face a second element along a specified direction, even if only a portion of the first element faces the second element without any intervening structures disposed along the specified direction between the portion of the first element and the second element.

The transverse portion 136 includes a first transverse conduit 220 extending from the first connection portion 182 along the transverse axis 176, and a second transverse conduit 222 extending from the first connection portion 182 along the transverse axis 176. The second transverse conduit 222 is disposed around the first transverse conduit 220, such that the first transverse conduit 220 is disposed within the second transverse conduit 222 along a direction transverse to the transverse axis 176. Further, the transverse portion 136 may optionally include a transverse member 230 extending from the second connection portion 184 along the transverse axis 176.

An internal surface of the first transverse conduit 220 defines a first transverse flow passage 224 through the transverse portion 136. An external surface of the first transverse conduit 220 and an internal surface of the second transverse conduit 222 define a second transverse flow passage 226 through the transverse portion 136. Thus, the second transverse flow passage 226 may be an annular flow passage defined between the first transverse conduit 220 and the second transverse conduit 222. The external surface of the first transverse conduit 220 may directly face the internal surface of the second transverse conduit 222 along a direction normal to the transverse axis 176. The transverse member 230 may be a hollow tube or a solid rod, for example.

The first connection portion 182 of the nozzle portion 138 may include a first land 240 and a second land 242 disposed radially outside the first land 240. The first transverse conduit 220 may be received within a recess defined by the first land 240, such that the first transverse conduit 220 overlaps with the first land 240 along the transverse axis 176. The second transverse conduit 222 may be received within a recess defined by the second land 242, such that the second transverse conduit 222 overlaps with the second land 242 along the transverse axis 176.

It will be appreciated that each of the first land 240 and the second land 242 may at least partly define the first transverse flow passage 224 and the second transverse flow passage 226, respectively. The first land 240 may directly face the second land 242 along a direction normal to the transverse axis 176. An axial length of the first land 240 may extend beyond an axial length of the second land 242 away from the longitudinal axis 174 along the transverse axis 176. According to an aspect of the disclosure, each of the first land 240 and the second land 242 has a circular cylindrical shape.

The first transverse conduit 220 may form a seal with the first land 240, and the second transverse conduit 222 may form a seal with the second land 242. According to an aspect of the disclosure, an external surface of the first transverse conduit 220 is welded or brazed to the first land 240, and an external surface of the second transverse conduit 222 is welded or brazed to the second land 242. However, it will be appreciated that other means of fastening and sealing known in the art may be applied between the first transverse conduit 220 and the first land 240, and between the second transverse conduit 222 and the second land 242.

The first transverse flow passage 224 may be fluidly coupled to the supply of exhaust fluid 124 via the exhaust fluid conduit 130, to selectively receive exhaust fluid from the supply of exhaust fluid 124. The second transverse flow passage 226 may be fluidly coupled to the supply of pressurized gas 126 via the gas conduit 132, to selectively receive pressurized gas from the supply of pressurized gas 126. In turn, the first transverse flow passage 224 and the first axial flow path 204 may at least partly compose an exhaust fluid flow path; and the second transverse flow passage 226 and the second axial flow path 206 may at least partly compose a pressurized gas flow path.

According to an aspect of the disclosure, the pressurized gas flow path is free from fluid communication with the exhaust fluid flow path upstream of the nozzle tip 158. Accordingly, there may be no fluid communication between the pressurized gas flow path and the exhaust fluid flow path at any point upstream of the outlet of the first axial conduit 200. A downstream direction may extend along the exhaust fluid flow path from the first transverse flow passage 224 toward the first axial flow path 204. Similarly, the downstream direction may extend along the pressurized gas flow path from the second transverse flow passage 226 toward the second axial flow path 206. Conversely, an upstream direction may extend opposite to the corresponding downstream direction.

The second connection portion 184 may include a land 244, and the transverse member 230 may be received within a recess defined by the land 244, such that the transverse member 230 overlaps with the land 244 along the transverse axis 176. An external surface of the transverse member 230 may be welded or brazed to the land 244. According to an aspect of the disclosure, the land 244 has a circular cylindrical shape.

The nozzle portion 138 includes a transition section 250, which includes a first transition conduit 252, and a second transition conduit 254 disposed around the first transition conduit 252, such that the first transition conduit 252 is disposed inside the second transition conduit 254. An inner surface of the first transition conduit 252 may define a first transition flow passage 256. Further, an outer surface of the first transition conduit 252 and an inner surface of the second transition conduit 254 may define a second transition flow passage 258 therebetween. The outer surface of the first transition conduit 252 may directly face the inner surface of the second transition conduit 254 along either the longitudinal axis 174 or the radial direction 160. According to an aspect of the disclosure, the first transition conduit 252 may be concentric with the second transition conduit 254, such that a centerline of the first transition conduit 252 may be coincident with a centerline of the second transition conduit 254.

Either of the first transition conduit 252 or the second transition conduit 254 may include a miter elbow or a smooth radius elbow. According to an aspect of the disclosure, a smooth radius elbow has a radius of curvature that is at least 15% of an internal diameter of the corresponding elbow flow passage, where the radius of curvature is measured along the corresponding flow passage centerline.

The first land 240 may be fixed to the first axial conduit 200 via the first transition conduit 252, and the second land 242 may be fixed to the second axial conduit 202 via the second transition conduit 254. In turn, the first transverse flow passage 224 may be fluidly coupled to the first axial flow path 204 via the first transitional flow passage 256, and the second transverse flow passage 226 may be fluidly coupled to the second axial flow path 206 via the second transitional flow passage 258.

The injector assembly 122 may include a shell 280 that at least partially surrounds the second axial conduit 202, the second transition conduit 254, or both. An internal surface of the shell 280 may directly face an external surface of the second axial conduit 202 along the radial direction 160.

A shell volume 282 may be at least partly defined between an interior surface of the shell 280 and an exterior surface of the second axial conduit 202. Further, the shell volume 282 may also be at least partly defined between an interior surface of the shell 280 and an exterior surface of the second transition conduit 254. According to an aspect of the disclosure, the shell volume 282 is exclusively defined between the interior surface of the shell 280 and both the exterior surface of the second axial conduit 202 and the exterior surface of the second transition conduit 254.

The injector assembly 122 may also include a third transverse conduit 290 disposed radially outside of the second transverse conduit 222, such that the second transverse conduit 222 is disposed within the third transverse conduit 290. As illustrated in FIG. 4, the exterior surface of the second transverse conduit 222 may directly face an interior surface of the third transverse conduit 290 along a direction normal to the transverse axis 176. Further, an exterior surface of the shell 280 may be in direct contact with exhaust gas when the injector assembly 122 is installed in the exhaust duct 120. Moreover, the exterior surface of the second axial conduit 202 may not be in direct contact with exhaust gas when the injector assembly 122 is installed in the exhaust duct 120 because the shell 280 may completely block fluid communication between the exhaust gas and the exterior surface of the second axial conduit 202.

The interior surface of the third transverse conduit 290 and the exterior surface of the second transverse conduit 222 may define a third transverse flow passage 292 therebetween. The third transverse flow passage 292 may be in direct fluid communication with the shell volume 282. Alternatively, the third transverse flow passage 292 may be blocked from fluid communication with the shell volume 282

The first connection portion 182 may further include a third land 300 disposed radially outside of the second land 242. The third transverse conduit 290 may be received within a recess defined by the third land 300, such that the third transverse conduit 290 overlaps with the third land 300 along the transverse axis 176. The third land 300 may directly face the second land 242 along a direction normal to the transverse axis 176.

The third transverse conduit 290 may form a seal with the third land 300. According to an aspect of the disclosure, an external surface of the third transverse conduit 290 is welded or brazed to the third land 300. However, it will be appreciated that other means of fastening and sealing may be applied between the third transverse conduit 290 and the third land 300.

The nozzle portion 138 may include one or more struts 310 disposed in the exhaust fluid flow path, the compressed gas flow path, the shell volume 282, or combinations thereof. For example, a strut 310 may extend from an interior surface of the shell 280 to an exterior surface of either the second transition conduit 254 or the second axial conduit 202, and be rigidly fixed to the shell 280 at least one of the second transition conduit 254 and the second axial conduit 202. Further, a strut 310 may extend from an exterior surface of either the first transition conduit 252 or the first axial conduit 200 to an interior surface of either the second transition conduit 254 or the second axial conduit 202; and the strut 310 may be rigidly fixed to either the first transition conduit 252 or the first axial conduit 200, and rigidly fixed to either the second transition conduit 254 or the second axial conduit 202. The struts 310 may promote structural strength of the nozzle portion 138, provide a flow conditioning function for fluid flows within the nozzle portion 138, promote manufacturability by 3D printing processes, or combinations thereof.

Any of the struts 310 may be impermeable to fluid flow or permeable to fluid flow, and the nozzle portion 138 can include a plurality of struts 310 that exhibit a mix of permeability and impermeability to fluid flow. A strut 310 that is impermeable to fluid flow may be formed from a solid material, such as a solid metal, for example. A strut 310 that is permeable to flow may be formed from a lattice structure, such as a metallic lattice structure, for example.

Figure 5:
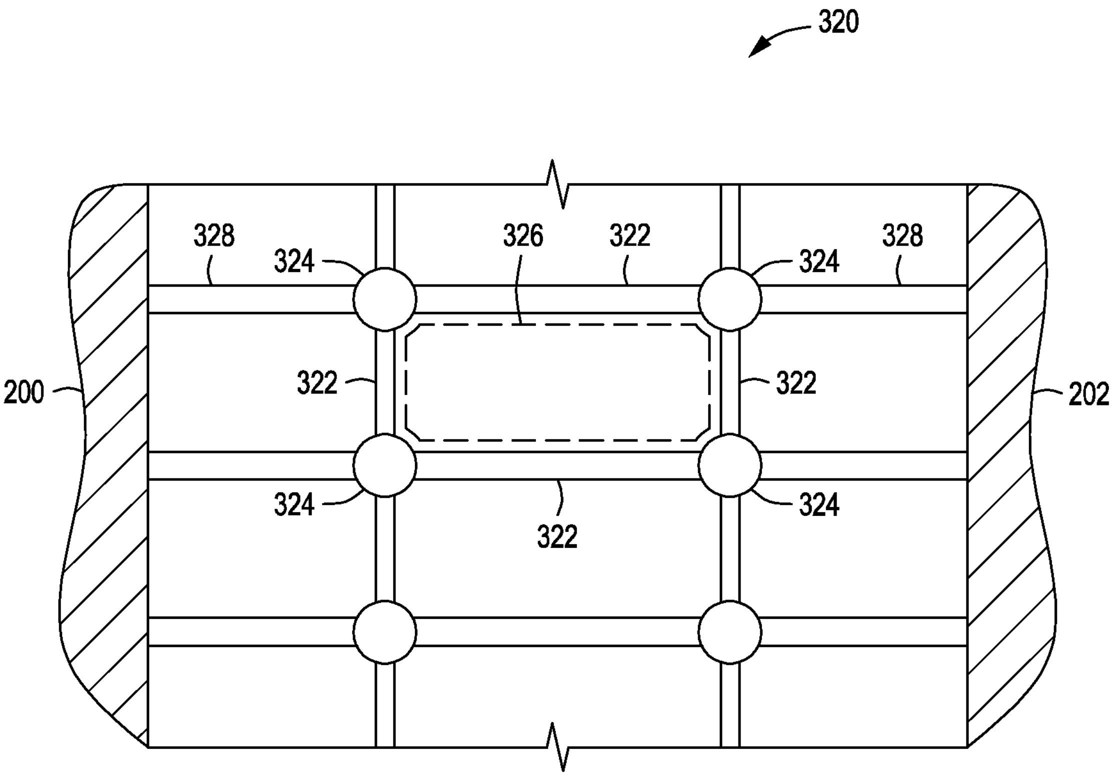
FIG. 5 is a schematic view of a lattice structure, according to an aspect of the disclosure.

FIG. 5 is a schematic view of a lattice structure 320, according to an aspect of the disclosure. The lattice structure 320 may include a plurality of beams 322 that are rigidly interconnected with one another via a plurality of nodes 324. The plurality of beams 322 and the plurality of nodes 324 may define a plurality of cells 326 that are permeable to fluid flow. The plurality of beams 322 includes a plurality of edge beams 328 that are rigidly fixed to a node 324 on one end, and rigidly fixed to a flowpath-defining surface of the nozzle portion 138 on the other end. As illustrated in FIG. 5, the lattice structure 320 spans the first axial flow path 204 between the first axial conduit 200 and the second axial conduit 202. However, it will be appreciated that the lattice structure 320 may be applied between other internal surfaces of the nozzle portion 138, and may compose at least a portion, or an entirety, of any of the struts 310 illustrated in FIG. 4.

The lattice structure 320 may be a two-dimensional lattice structure, where all nodes of the plurality of nodes 324 lie in a single plane. Alternatively, the lattice structure 320 may be a three-dimensional lattice structure, where the plurality of nodes 324 lies in multiple, non-coplanar planes. Although the lattice structure 320 is schematically represented as a rectangular lattice structure in FIG. 7, it will be appreciated that the lattice structure 320 may embody any known lattice structure design.

Returning to FIG. 4, the shell volume 282 may be filled with insulation 340. The insulation 340 may be a gas-phase insulation, such as air; a solid-phase pourable insulation that is poured into the shell volume 282 via an aperture 342 through the second connection portion 184; or any other suitable insulation known in the art. A plug 344 may be used to close the aperture 342 after filling the shell volume 282 with the insulation 340. The plug 344 may engage the aperture 342 with a threaded connection, a press-fit connection, an adhesive connection, a brazed connection, a welded connection, combinations thereof, or any other suitable connection method known in the art. The insulation 340 may benefit the life and/or operability of the nozzle portion 138 by limiting heat transfer from the exhaust gas 108 into the first axial flow path 204, the second axial flow path 206, or both.

The insulation 340 may include mineral insulation such as perlite, vermiculite, silica, or any other mineral insulation material known in the art. The insulation 340 may be a pourable, solid-phase insulation containing between 60-90% amorphous silica, 5-40% silicon carbide, and 0-5% aluminum oxide.

According to an aspect of the disclosure, the insulation 340 has a thermal conductivity that is less than 10 W/m·K. According to another aspect of the disclosure, the insulation 340 has a thermal conductivity that is less than 2 W/m·K. The insulation 340 may have a thermal conductivity that is less than a thermal conductivity of the shell 280. According to yet another aspect of the disclosure, the insulation 340 may be FreeFlow™ 1000*x*, as manufactured by Promat Incorporated.

Figure 6:
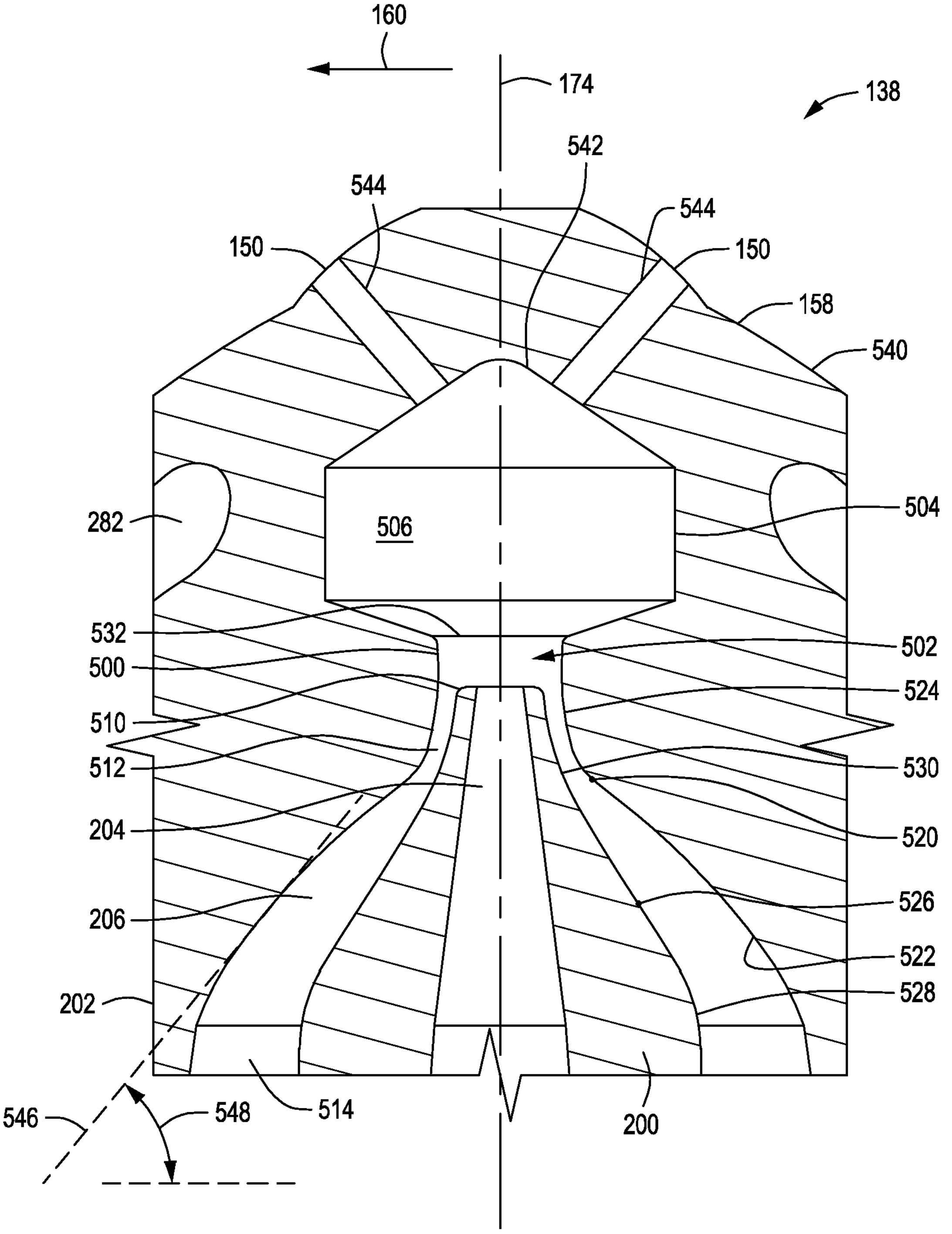
FIG. 6 is a partial cross-sectional view of a nozzle portion, according to an aspect of the disclosure.

FIG. 6 is a partial cross-sectional view of a nozzle portion 138, according to an aspect of the disclosure. The cross section for FIG. 6 is taken along a cutting plane that includes the longitudinal axis 174.

The inner surface of the second axial conduit 202 may define a peripheral wall 500 of a first mixing chamber 502, and a peripheral wall 504 of a second mixing chamber 506. One or both of the peripheral wall 500 and the peripheral wall 504 may be axisymmetric surfaces of revolution about the longitudinal axis 174. An outlet 510 of the first axial flow path 204 may define the inlet to the first mixing chamber 502, such that the outlet 510 of the first axial flow path 204 is immediately adjacent to the inlet to the first mixing chamber 502. The outlet 510 of the first axial flow path 204 may also define the axial location of the outlet of the second axial flow path 206. According to an aspect of the disclosure, the outlet 510 of the first axial flow path 204 lies in a plane that is transverse to the longitudinal axis 174. In turn, the first axial flow path 204 and the second axial flow path 206 are in fluid communication with the second mixing chamber 506 via the first mixing chamber 502.

A flow area of the second axial flow path 206 decreases from an inlet 514 to a throat section 512, and then increases from the throat section 512 to the axial location of the outlet 510. Further, the flow area of the second axial flow path 206 may monotonically decrease from the inlet 514 to the throat section 512, and may monotonically increase from the throat section 512 to the axial location of the outlet 510.

Thus, the second axial flow path 206 may define a converging-diverging nozzle, having a throat section 512 that is disposed upstream of the outlet 510 of the first axial flow path 204. In turn, it will be appreciated that the second axial flow path 206 is capable of producing either subsonic or transonic-to-supersonic flow conditions at the outlet 510, depending on the gas supply pressure applied to the second axial flow path 206 and a pressure in the first mixing chamber 502. The inlet 514 to the second axial flow path 206 may have a flow area that is at least 15 times greater than a flow area of the throat section 512, and a flow area of the second axial flow path 206 at the outlet 510 may be between 2-10% greater than the flow area of the throat section 512, for example.

The internal surface of the second axial conduit 202 may have an inflection point 520 that separates an upstream concave portion 522 from a downstream convex portion 524. The external surface of the first axial flow conduit 200 may have an inflection point 526 that separates an upstream convex portion 528 from a downstream concave portion 530. The upstream concave portion 522 of the second axial conduit 202 may directly face the upstream convex portion 528 of the first axial conduit 200; and the downstream convex portion 524 of the second axial conduit 202 may directly face the downstream concave portion 530 of the first axial conduit 200.

The convex portion 524 of the second axial conduit 202 may extend from the throat section 512 to the outlet 532 of the first mixing chamber 502. According to an aspect of the disclosure, the downstream end of the convex portion 524 of the second axial conduit 202 defines the axial location of the outlet 532 of the first mixing chamber 502, along the longitudinal direction 174.

An entirety of the external surface of the first axial conduit 200 from the throat section 512 to the outlet 510 of the first axial flow path 204 may be concave. Similarly, an entirety of the internal surface of the second axial flow conduit 202 from the throat section 512 to the outlet 532 of the first mixing chamber 502 may be convex.

An entirety of the external surface of the first axial conduit 200 from the inflection point 526 to the outlet 510 of the first axial flow path 204 may be concave. Similarly, an entirety of the internal surface of the second axial flow conduit 202 from the inflection point 520 to the outlet 532 of the first mixing chamber 502 may be convex.

To promote fluid performance and manufacturability, the inflection point 520 of the second axial conduit 202 may be disposed between the inflection point 526 of the first axial conduit 200 and the outlet 510 of the first axial conduit 200 along the longitudinal direction 174. Further to promote fluid performance and manufacturability, the inflection point 526 of the first axial conduit 200 may lie radially outside the inflection point 520 of the second axial conduit 202, along the radial direction 160. Either or both of the inflection point 526 and the inflection point 520 may be located upstream of the throat section 512.

The nozzle portion 138 may also include an end wall 540 that abuts the second axial conduit 202. An inner surface of the end wall 540 may define a ceiling 542 that abuts the peripheral wall 504 and that defines an outlet of the second mixing chamber 506. Further, the end wall 540 may define outlet flow passages 544 therethrough, such that the outlet flow passages 544 extend from the ceiling 542 of the second mixing chamber 506 to the outlet apertures 150 on the external surface 180 of the nozzle portion 138. Accordingly, the second mixing chamber 506 is in fluid communication with the outlet apertures 150 via the outlet flow passages 544.

A line 546 is tangent to the inner surface of the second axial conduit 202. According to an aspect of the disclosure, an angle between the line 546 and the radial direction 160 is not less than 45 degrees anywhere along the second axial flow path 206, to promote manufacturability by 3D printing processes by providing sufficient support for consecutively printed layers.

Figure 7:
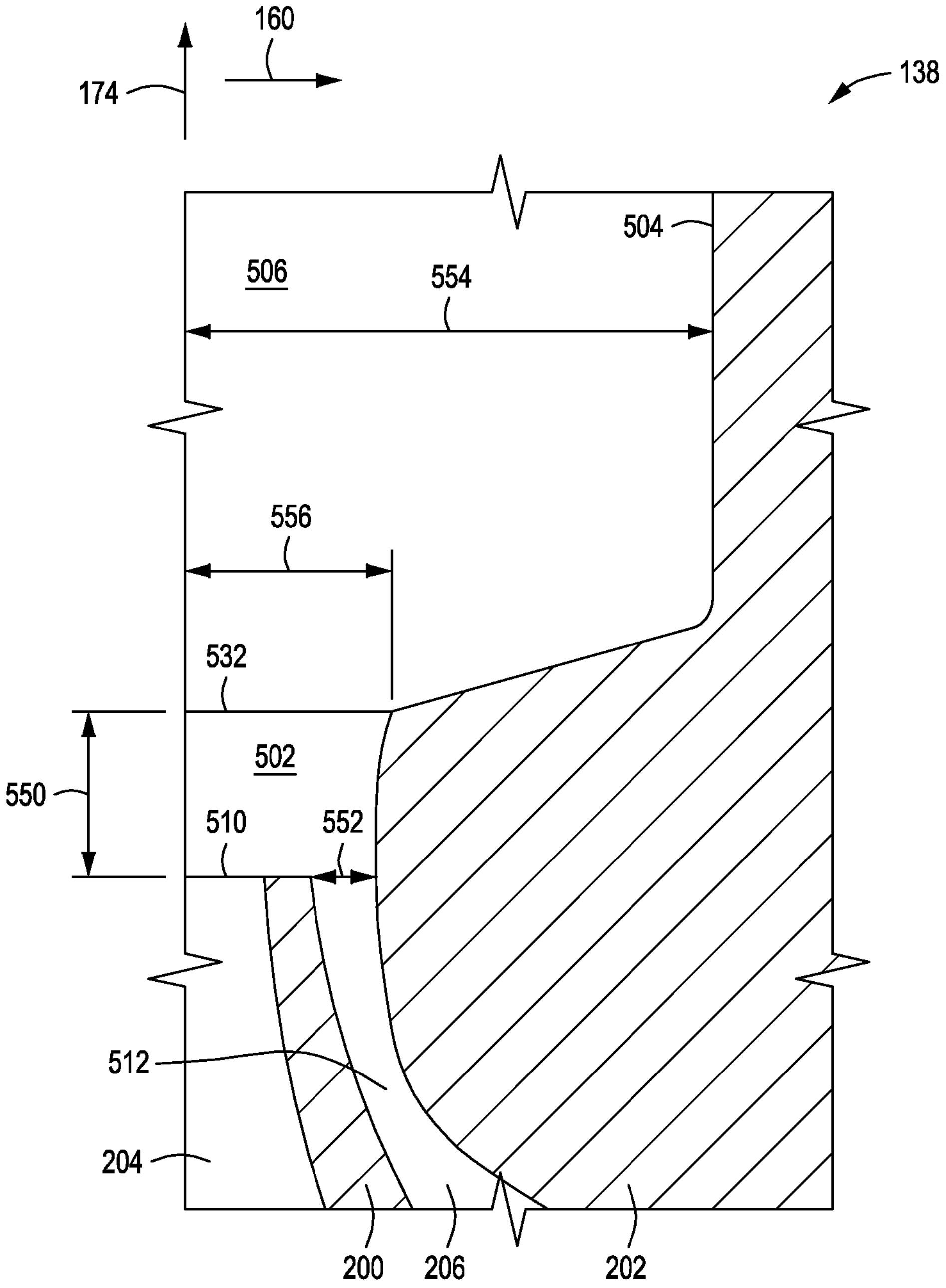
FIG. 7 is a partial cross-sectional view of a nozzle portion, according to an aspect of the disclosure.

FIG. 7 is a partial cross-sectional view of a nozzle portion 138, according to an aspect of the disclosure. The cross section for FIG. 7 is taken along a cutting plane that includes the longitudinal axis 174.

A first mixing chamber length 550 is defined as a distance, along the longitudinal direction 174, from the outlet 510 of the first axial flow path 204 to the outlet 532 of the first mixing chamber 502. A transverse gap 552 of the second axial flow path 206 is defined as a distance, along the radial direction 160, from the external surface of the first axial conduit 200 at the outlet 510 to the internal surface of the second axial conduit 202.

A maximum diametrical span 554 of the second mixing chamber 506, along the transverse direction 160, is greater than a diametrical span 556 of the outlet 532 of the first mixing chamber 502. According to an aspect of the disclosure, the maximum diametrical span 554 of the second mixing chamber 506 is at least twice as large as the diametrical span 556 of the outlet 532 of the first mixing chamber 502.

Figure 8:
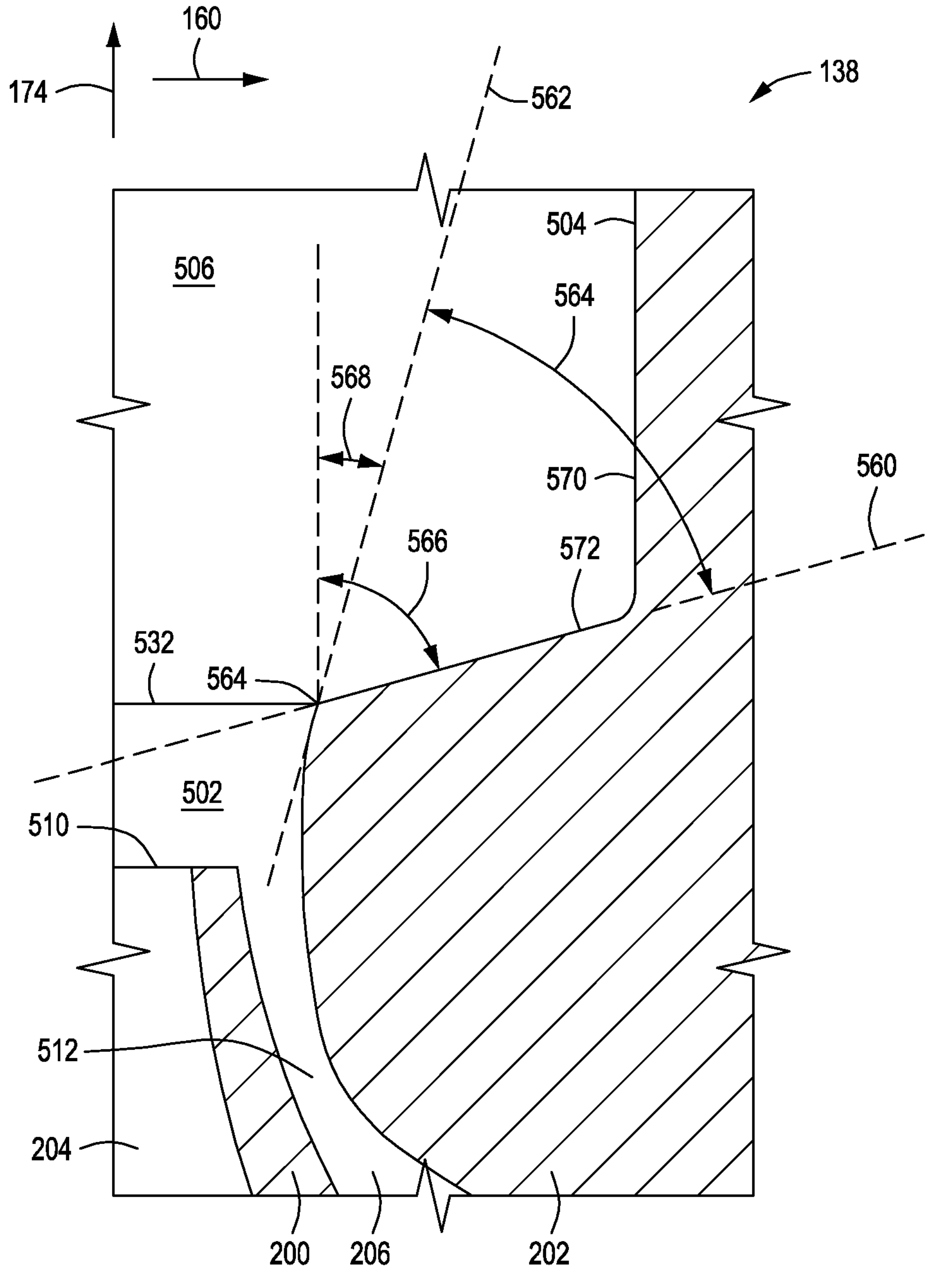
FIG. 8 is a partial cross-sectional view of a nozzle portion, according to an aspect of the disclosure.

FIG. 8 is a partial cross-sectional view of a nozzle portion 138, according to an aspect of the disclosure. The cross section for FIG. 8 is taken along a cutting plane that includes the longitudinal axis 174.

A first tangent line 560 is tangent to the inner surface of the second axial conduit 202 at an inlet to the second mixing chamber 506. A second tangent line 562 is tangent to the inner surface of the second axial conduit 202 at the outlet 532 of the first mixing chamber 502. In the aspect illustrated in FIG. 8, the inlet to the second mixing chamber 506 is immediately adjacent to the outlet 532 of the first mixing chamber 502.

The first mixing chamber 502 may be demarcated from the second mixing chamber 506 by an abrupt expansion in flow area that promotes mixing and atomization performance of the nozzle portion 138. The abrupt expansion in flow area may be defined by an angle 564 between the first tangent line 560 and the second tangent line 562 lying within a range from 30 to 80 degrees. According to other applications, the abrupt expansion in flow area may be defined by the angle 564 between the first tangent line 560 and the second tangent line 562 lying within a range from 47 to 67 degrees.

An expansion angle 566 defined between the first tangent line 560 and the longitudinal direction 174 may lie in a range from 50 to 80 degrees. An expansion angle 568 defined between the second tangent line 562 and the longitudinal direction 174 may lie in a range from 5 to 30 degrees.

The peripheral wall 504 may include a longitudinal portion 570 and a floor portion 572. The longitudinal portion 570 may be a cylindrical surface extending along the longitudinal direction 174. The floor portion 572 may be a frustoconical surface extending away from the longitudinal axis 174 along the radial direction 160, and extending away from the outlet 532 of the first mixing chamber 502 along the longitudinal direction 174. According to an aspect of the disclosure, first tangent line 560 is tangent to the floor portion 572. According to another aspect of the disclosure, the floor portion 572 is a frustoconical surface and the first tangent line 560 is tangent to the frustoconical surface of the floor portion 572. The floor portion 572 may directly face the ceiling 542 of the end wall 540 along the longitudinal direction 174.

Figure 9:
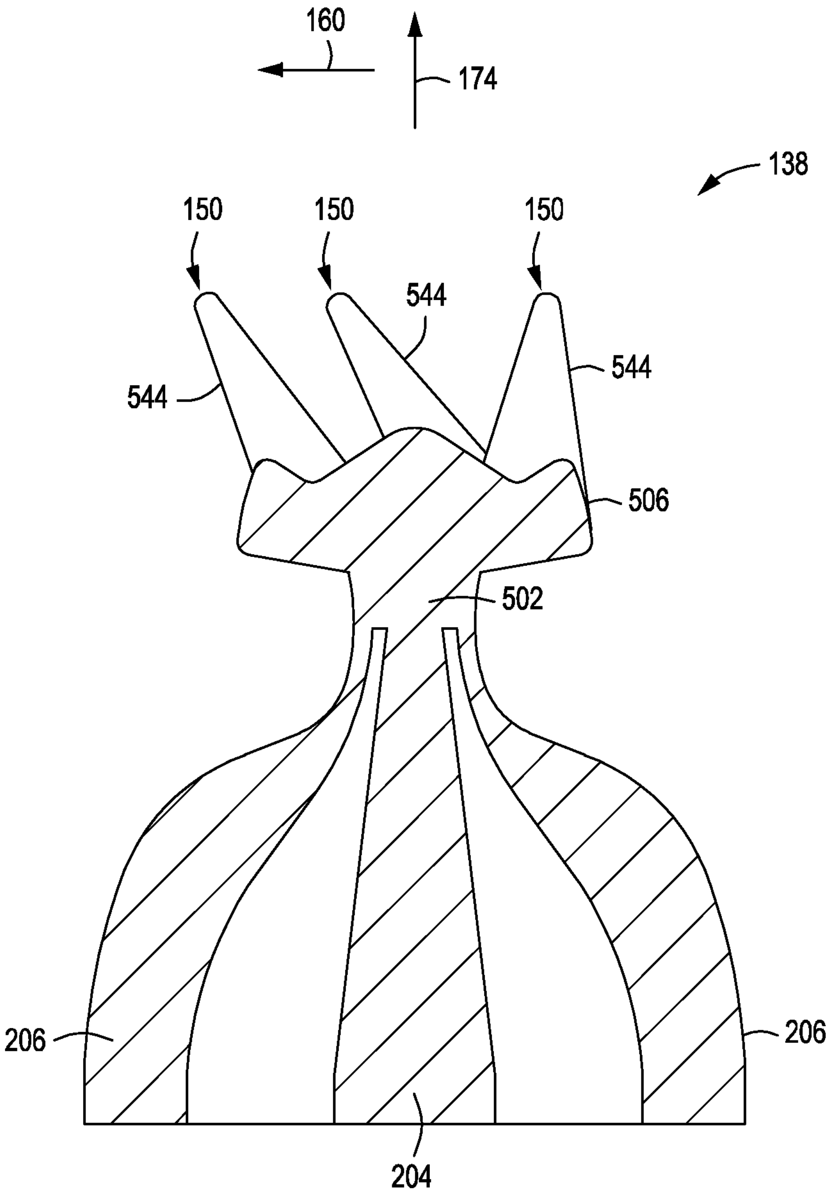
FIG. 9 is an inverse flow surface view of a nozzle portion, according to an aspect of the disclosure.

FIG. 9 is an inverse flow surface view of a nozzle portion 138, according to an aspect of the disclosure. To aid in describing flow passages within the nozzle portion 138, FIG. 9 illustrates surfaces within the nozzle portion 138 that are defined by direct contact with fluid flowing through the nozzle portion 138, should the fluid be hypothetically frozen solid and the structure of the nozzle portion 138 defining the flow passages should be hypothetically removed. Although FIG. 9 represents a hypothetical removal of the nozzle portion 138 structure that defines the internal flow passages, element labels for the corresponding affirmative structure are used in FIG. 9 for clarity and consistency.

The end wall 540 may define a plurality of outlet flow passages 544 that extend from the ceiling 542 to corresponding outlet apertures 150. Each of the outlet flow passages 544 may be discrete and arranged fluidly in parallel with all other outlet flow passages 544, such that the only fluid communication between the outlet flow passages 544 is via the second mixing chamber 506 or via outside the nozzle portion 138.

Each outlet flow passage 544 may slope along the circumferential direction 162 and/or slope toward the longitudinal axis 174 along the radial direction 160, as each outlet flow passage 544 extends from the ceiling 542 of the second mixing chamber 506 to its corresponding outlet aperture 150. According to an aspect of the disclosure, each outlet flow passage 544 monotonically slopes along the circumferential direction 162 as each outlet flow passage 544 extends from the ceiling 542 to its corresponding outlet aperture 150. According to yet another aspect of the disclosure, each outlet flow passage 544 twists along a helical path. As a result, the shape of the outlet flow passages 544 may advantageously impart streamwise vorticity or swirl into the flow exiting the outlet apertures 150. According to another aspect of the disclosure, the outlet flow passages 544 may not impart swirl or streamwise vorticity into the flow exiting the outlet apertures 150.

The outlet flow passages 544 may be uniformly distributed around the longitudinal axis 174, each being uniformly spaced from adjacent outlet flow passages 544 along the circumferential direction 162. Further, the outlet flow passages 544 may all be uniformly spaced from the longitudinal axis 174 along the radial direction 160. In some applications, a total number of outlet flow passages 544 may range from 4 to 8.

A cross section of each outlet flow passage 544, transverse to a bulk flow direction, may be circular, elliptical, triangular, square, or any other flow passage shape known in the art.

Figure 10:
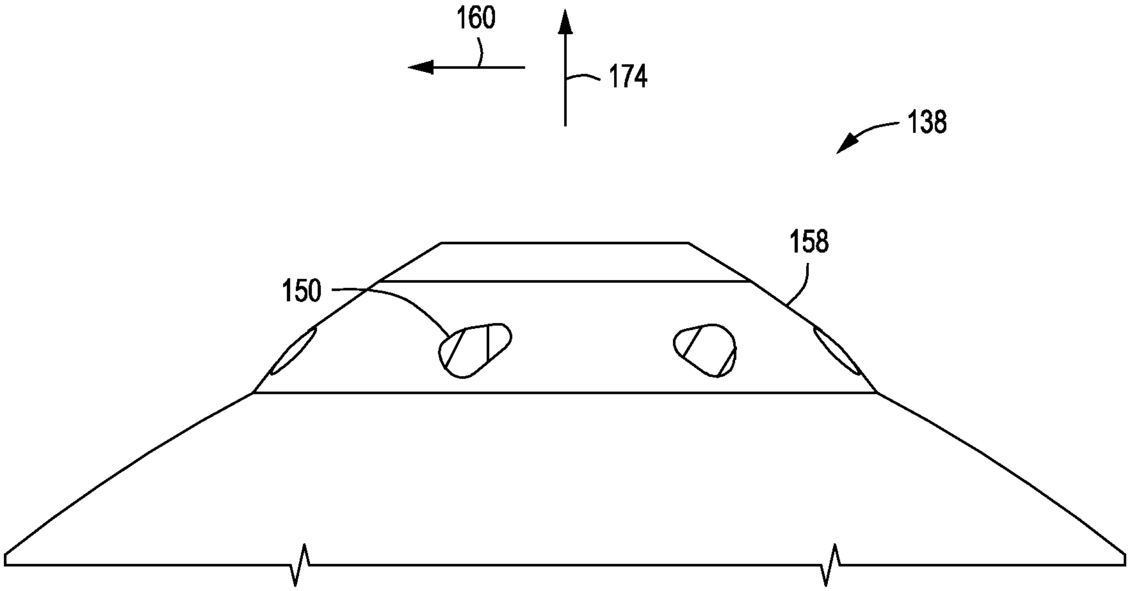
FIG. 10 is a partial side view of a nozzle portion, according to an aspect of the disclosure.

FIG. 10 is a partial side view of a nozzle portion 138, according to an aspect of the disclosure. As shown in FIG. 10, a cross section of each outlet flow passage 544, transverse to a bulk flow direction, is triangular. The triangular cross section may have sharp vertices, or round fillets may be applied in lieu of sharp vertices. The triangular cross section may extend along an entirety of each outlet flow passage 544 from the ceiling 543 of the second mixing chamber 506 to the outlet apertures 150.

INDUSTRIAL APPLICABILITY

Aspects of the present disclosure provide exhaust injection systems and exhaust fluid injectors with improved performance and reliability compared to conventional approaches, and do so with structures that are less expensive to manufacture.

As shown in FIGS. 4 and 6, DEF may be delivered to the first mixing chamber 502 along the first axial flow path 204, and pressurized gas may be delivered to the first mixing chamber 502 along the second axial flow path 206. The converging-diverging flow area profile of the second axial flow path 206 enables acceleration of the pressurized gas to transonic or supersonic velocities to promote mixing and atomization of the DEF. Further, rapid expansion of the gas and DEF mixture through the second mixing chamber 506 further promotes mixing and atomization of the DEF. Finally, injection of the gas and DEF mixture through the outlet flow passages 544 further promotes mixing and atomization of the DEF, and tailors the spatial distribution of the DEF in the exhaust duct to promote exhaust aftertreatment performance.

The present Applicant has identified designs for DEF injectors in exhaust systems that are superior to conventional approaches. With reference to FIG. 7, the present Applicant has identified that tailoring a ratio of the first mixing chamber length 550 divided by the transverse gap 552 yields superior fluid mixing and atomization performance. In some applications, maintaining a ratio of the first mixing chamber length 550 divided by the transverse gap 552 in a range from 1.9 to 3.4 yields advantageous mixing and atomization performance. According to other aspects of the disclosure, maintaining a ratio of the first mixing chamber length 550 divided by the transverse gap 552 in a range from 2.1 to 3.0 yields advantageous mixing and atomization performance. According to other aspects of the disclosure, maintaining a ratio of the first mixing chamber length 550 divided by the transverse gap 552 in a range from 2.3 to 2.7 yields advantageous mixing and atomization performance.

Further, the present applicant has identified that tailoring a ratio of total flow area for the plurality of outlet apertures 150 divided by the flow area of the second axial flow path 206 at the outlet 510 yields superior mixing and atomization performance. In some applications, maintaining the ratio of total flow area for the plurality of outlet apertures 150 divided by the flow area of the second axial flow path 206 at the outlet 510 in a range from 1.3 to 2.2 yields advantageous mixing and atomization performance.

As a result, improved spatial and temporal mixing uniformity of the exhaust fluid 152 with the exhaust gas 108 improve conversion performance of downstream emissions aftertreatment devices 106. For example, improved spatial and temporal mixing uniformity of a reductant within the exhaust gas 108 may advantageously promote $NO_x$ conversion in a downstream SCR catalyst.

According to an aspect of the disclosure, an entirety of the nozzle portion 138 is manufactured by three-dimensional (3D) printing or additive manufacturing to yield a single unitary or monolithic structure that is free from the seams or joints that result from assembly of conventional injectors or nozzles from a plurality of separately manufactured parts. The nozzle portion 138 may be fabricated by the 3D printing processes of fused filament fabrication, powder bed fusion (PBF), or any other 3D printing process known in the art. PBF processes may include direct metal laser sintering, selective laser sintering, selective laser melting, multi jet fusion, or electron beam melting, for example. The nozzle portion 138 may be 3D printed from metals such as steel alloys, stainless steel, nickel, nickel alloys, titanium, or any other metallic material known in the art of 3D printing.

The unitary or monolithic structure resulting from 3D printing of the nozzle portion 138 promotes reliability of the injector assembly 122 by eliminating seams, joints, and/or seals that are present in conventional multi-component nozzle assemblies. For example, elimination of seams, joints, and/or seals may promote reliability by reducing potential leak paths through the nozzle portion 138. Further, maintaining smooth contours of fluid surfaces along the first axial flow path 204, the second axial flow path 206, the first mixing chamber 502, and the second mixing chamber 506 reduces or eliminates crystallization of DEF within the nozzle, thereby promoting nozzle performance and life.

Further, 3D printing of the nozzle portion 138 promotes reliability by enabling integration of structural reinforcement, such as the struts 310, which may beneficially extend the life of the nozzle portion by improving resistance to thermal stress and other mechanical stresses within the nozzle portion 138. In particular aspects, the struts 310 may include a fluid-permeable lattice structure 320 that is integrally printed within internal flow paths of the nozzle portion 138 to simultaneously promote structural strength and fluid mechanical performance. In addition, the struts 310 may be rigidly fixed to internal surfaces of flow passages within the nozzle portion 138 by integrally forming the struts 310 with the nozzle portion 138 via 3D printing.

3D printing of the nozzle portion 138 may also permit extension of the shell volume 282 in close proximity to the nozzle tip 158 and outlet apertures 150, thereby providing the benefits of thermal insulation close to the outlet apertures 150. For example, as illustrated in FIGS. 4 and 6, the shell volume 282 may overlap with both the first mixing chamber 502 and the second mixing chamber 506 along the longitudinal direction 174, thereby locating at least a part of the shell volume 282 in close proximity to the outlet apertures 150.

Moreover, 3D printing of the nozzle portion 138 reduces the cost of manufacturing such high-performing injector assemblies 122 by eliminating manufacturing steps associated with multi-component nozzle portions, which may include conventional casting steps, conventional machining steps, and assembly of the multiple components to form the nozzle portion 138.

It will be appreciated that the present disclosure contemplates all possible permutations of features disclosed herein, even if all features of a particular permutation are not shown together in a single drawing, for the purpose of promoting clarity of individual features in the several drawings.

Further, it will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The invention claimed is:

1. A diesel exhaust fluid (DEF) nozzle, comprising:

a first conduit disposed about a longitudinal axis, an inner surface of the first conduit defining a first flow path, an outlet of the first conduit defining an inlet of a first mixing chamber, a longitudinal direction being parallel to the longitudinal axis, a transverse direction being transverse to the longitudinal direction; and a second conduit disposed around the first conduit, an outer surface of the first conduit and an inner surface of the second conduit defining a second flow path therebetween, a flow area of the second flow path decreasing from an inlet of the second flow path to a throat, the flow area of the second flow path increasing from the throat to an outlet of the second flow path, the outlet of the second flow path being in direct fluid communication with the first mixing chamber, the inner surface of the second conduit defining a peripheral wall of the first mixing chamber, the inner surface of the second conduit defining a peripheral wall of a second mixing chamber, the first flow path and the second flow path being in fluid communication with the second mixing chamber via the first mixing chamber, a maximum diametrical span of the second mixing chamber, along the transverse direction, being greater than a diametrical span of an outlet of the first mixing chamber, along the transverse direction, a first mixing chamber length being defined between the outlet of the first conduit and the outlet of the first mixing chamber, along the longitudinal direction, a transverse gap width of the second flow path being defined as a distance along the transverse direction from the inner surface of the second conduit to the outer surface of the first conduit at the outlet of the first conduit, a ratio of the first mixing chamber length divided by the transverse gap width being not less than 1.9 and not greater than 3.4, the ratio of the first mixing chamber length divided by the transverse gap width being dimensionless.

2. The DEF nozzle of claim 1, wherein a first line is tangent to the inner surface of the second conduit at the inlet of the second mixing chamber, the first line lying in a plane including the longitudinal axis, wherein a second line is tangent to the inner surface of the second conduit at the outlet of the first mixing chamber, the second line lying in the plane including the longitudinal axis, and an angle defined between the first line and the second line is not less than 30 degrees and not greater than 80 degrees.

3. The DEF nozzle of claim 2, wherein the first line and the longitudinal direction define a first expansion angle of the second mixing chamber, the transverse direction being perpendicular to the longitudinal direction, and the first expansion angle of the second mixing chamber is not less than 50 degrees and not greater than 80 degrees.

4. The DEF nozzle of claim 3, wherein the second line and the longitudinal direction define a first expansion angle of the first mixing chamber, and the first expansion angle of the first mixing chamber is not less than 5 degrees and not greater than 30 degrees.

5. The DEF nozzle of claim 1, further comprising an end wall disposed at an outlet end of the second conduit, an inner surface of the end wall defining an outlet of the second mixing chamber, the end wall defining at least one outlet flow passage therethrough, the at least one outlet flow passage extending from the outlet of the second mixing chamber and through an outer surface of the end wall.

6. The DEF nozzle of claim 5, wherein the at least one outlet flow passage includes a plurality of outlet flow passages.

7. The DEF nozzle of claim 6, wherein intersection of the plurality of outlet flow passages with the outer surface of the end wall defines a plurality of outlet flow apertures, the plurality of outlet flow apertures having a total outlet flow area, and a ratio of the total outlet flow area of the plurality of outlet flow apertures divided by the total flow area at the outlet of the second flow path is not less than 1.3 and not greater than 2.2.

8. The DEF nozzle of claim 1, wherein the outlet of the first conduit and the outlet of the second flow path both lie in a common plane, the common plane defining the inlet of the first mixing chamber and being perpendicular to the longitudinal direction.

9. The DEF nozzle of claim 1, wherein the ratio of the first mixing chamber length divided by the transverse gap width is not less than 2.1 and not greater than 3.0.

10. The DEF nozzle of claim 9, wherein the ratio of the first mixing chamber length divided by the transverse gap width is not less than 2.3 and not greater than 2.7.

11. The DEF nozzle of claim 1, wherein a first line is tangent to the inner surface of the second conduit along the second flow path, the first line lying in a plane including the longitudinal axis, the first line and the transverse direction define an angle of the second flow path, the transverse direction being perpendicular to the longitudinal direction, and the angle of the second flow path is not less than 45 degrees at any point along the second flow path.

12. The DEF nozzle of claim 1, wherein an intersection of a reference plane and the outer surface of the first conduit defines an outer contour of the first conduit, the reference plane including the longitudinal axis, the outer contour of the first conduit being convex upstream of a first inflection point, and being concave downstream of the first inflection point.

13. The DEF nozzle of claim 12, wherein an intersection of the reference plane with the inner surface of the second conduit defines an inner contour of the second conduit, the inner contour of the second conduit being concave upstream of a second inflection point, and being convex downstream of the second inflection point.

14. The DEF nozzle of claim 13, wherein the second inflection point is disposed upstream of the outlet of the first conduit along the longitudinal direction.

15. An exhaust system for an internal combustion engine, the exhaust system comprising:

an exhaust conduit that receives exhaust gas from the internal combustion engine; and an injector for injecting diesel exhaust fluid (DEF) into the exhaust conduit, the injector comprising a first conduit disposed about a longitudinal axis, an inner surface of the first conduit defining a first flow path, an outlet of the first conduit defining an inlet of a first mixing chamber, a longitudinal direction being parallel to the longitudinal axis, a transverse direction being transverse to the longitudinal direction; and a second conduit disposed around the first conduit, an outer surface of the first conduit and an inner surface of the second conduit defining a second flow path therebetween, a flow area of the second flow path decreasing from an inlet of the second flow path to a throat, the flow area of the second flow path increasing from the throat to an outlet of the second flow path, the outlet of the second flow path being in direct fluid communication with the first mixing chamber, the inner surface of the second conduit defining a peripheral wall of the first mixing chamber, the inner surface of the second conduit defining a peripheral wall of a second mixing chamber, the first flow path and the second flow path being in fluid communication with the second mixing chamber via the first mixing chamber, a maximum diametrical span of the second mixing chamber, along the transverse direction, being greater than a diametrical span of an outlet of the first mixing chamber, along the transverse direction, a first mixing chamber length being defined between the outlet of the first conduit and the outlet of the first mixing chamber, along the longitudinal direction, a transverse gap width of the second flow path being defined as a distance along the transverse direction from the inner surface of the second conduit to the outer surface of the first conduit at the outlet of the first conduit, a ratio of the first mixing chamber length divided by the transverse gap width being not less than 1.9 and not greater than 3.4, the ratio of the first mixing chamber length divided by the transverse gap width being dimensionless.

16. The exhaust system of claim 15, wherein a first line is tangent to the inner surface of the second conduit at the inlet of the second mixing chamber, the first line lying in a plane including the longitudinal axis, wherein a second line is tangent to the inner surface of the second conduit at the outlet of the first mixing chamber, the second line lying in the plane including the longitudinal axis, and an angle defined between the first line and the second line is not less than 30 degrees and not greater than 80 degrees.

17. A diesel exhaust fluid (DEF) nozzle, comprising:

a first conduit disposed about a longitudinal axis, an inner surface of the first conduit defining a first flow path, an outlet of the first conduit defining an inlet of a first mixing chamber, a longitudinal direction being parallel to the longitudinal axis, a transverse direction being transverse to the longitudinal direction; and a second conduit disposed around the first conduit, an outer surface of the first conduit and an inner surface of the second conduit defining a second flow path therebetween, a flow area of the second flow path decreasing from an inlet of the second flow path to a throat, the flow area of the second flow path increasing from the throat to an outlet of the second flow path, the outlet of the second flow path being in direct fluid communication with the first mixing chamber, the inner surface of the second conduit defining a peripheral wall of the first mixing chamber, the inner surface of the second conduit defining a peripheral wall of a second mixing chamber, the first flow path and the second flow path being in fluid communication with the second mixing chamber via the first mixing chamber, wherein an intersection of a reference plane and the outer surface of the first conduit defines an outer contour of the first conduit, the reference plane including the longitudinal axis, the outer contour of the first conduit including a convex portion upstream of a first inflection point, and including a concave portion downstream of the first inflection point, wherein an intersection of the reference plane with the inner surface of the second conduit defines an inner contour of the second conduit, the inner contour of the second conduit including a concave portion upstream of a second inflection point, and including a convex portion downstream of the second inflection point, and wherein the concave portion of the inner contour of the second conduit directly faces the convex portion of the outer contour of the first conduit, along the transverse direction.

18. The DEF nozzle of claim 17, wherein the convex portion of the inner contour of the second conduit directly faces the concave portion of the outer contour of the first conduit, along the transverse direction.

19. The DEF nozzle of claim 17, wherein the second inflection point is disposed between the outlet of the first conduit and the first inflection point, along the longitudinal direction.

20. The DEF nozzle of claim 17, further comprising an end wall disposed at an outlet end of the second conduit, an inner surface of the end wall defining an outlet of the second mixing chamber, the end wall defining at least one outlet flow passage therethrough, the at least one outlet flow passage extending from the outlet of the second mixing chamber and through an outer surface of the end wall.

* * * * *